United States Patent
Pieger et al.

(10) Patent No.: US 11,679,450 B2
(45) Date of Patent: Jun. 20, 2023

(54) TOOL CHANGE FOR ADDITIVE MANUFACTURING

(71) Applicant: TRUMPF Laser-und Systemtechnik GmbH, Ditzingen (DE)

(72) Inventors: Markus Pieger, Wendlingen am Neckar (DE); Felix Linder, Pforzheim (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 408 days.

(21) Appl. No.: 16/851,341

(22) Filed: Apr. 17, 2020

(65) Prior Publication Data
US 2020/0269373 A1 Aug. 27, 2020

Related U.S. Application Data

(63) Continuation of application No. PCT/EP2018/077742, filed on Oct. 11, 2018.

(30) Foreign Application Priority Data

Oct. 17, 2017 (DE) .......................... 102017124177.9

(51) Int. Cl.
*B23Q 3/155* (2006.01)
*B33Y 30/00* (2015.01)
(Continued)

(52) U.S. Cl.
CPC .............. *B23K 26/34* (2013.01); *B22F 10/28* (2021.01); *B22F 12/224* (2021.01);
(Continued)

(58) Field of Classification Search
None
See application file for complete search history.

(56) References Cited

U.S. PATENT DOCUMENTS

2013/0089642 A1* 4/2013 Lipson ................. B29C 64/118
426/115
2016/0095959 A1 4/2016 Bonassar et al.
(Continued)

FOREIGN PATENT DOCUMENTS

CN 105026131 A 11/2015
DE 4325573 C2 9/1998
(Continued)

OTHER PUBLICATIONS

CN Office Action in Chinese Appln. No. 201880067909.5, dated Jan. 12, 2022, 18 pages (with English translation).
(Continued)

*Primary Examiner* — Alexander M Weddle
(74) *Attorney, Agent, or Firm* — Fish & Richardson P.C.

(57) ABSTRACT

An additive manufacturing apparatus includes a housing which provides a manufacturing space for additive manufacturing, a linear drive arranged in the manufacturing space and having a base body, which is movable along a movement axis of the linear drive in the manufacturing space, and a tool holder for taking up a tool unit. The tool holder is attached to the base body so as to be rotatable about a rotation axis and is moved with the base body along the movement axis of the linear drive. The tool holder further comprises a clamping device having an unclamped operating state for taking up and taking out the tool unit and a clamped operating state for fixing the received tool unit. Furthermore, the additive manufacturing apparatus has a tool store, which is arranged in the manufacturing space and provides a plurality of tool places for tool units.

7 Claims, 5 Drawing Sheets

(51) Int. Cl.
  *B23K 26/34* (2014.01)
  *B23K 26/354* (2014.01)
  *B28B 1/00* (2006.01)
  *B33Y 10/00* (2015.01)
  *B22F 10/28* (2021.01)
  *B22F 12/00* (2021.01)
  *B33Y 50/02* (2015.01)
  *B22F 12/90* (2021.01)

(52) U.S. Cl.
  CPC ............ *B22F 12/226* (2021.01); *B22F 12/38* (2021.01); *B23K 26/354* (2015.10); *B23Q 3/15573* (2013.01); *B28B 1/001* (2013.01); *B33Y 10/00* (2014.12); *B33Y 30/00* (2014.12); *B22F 12/90* (2021.01); *B33Y 50/02* (2014.12)

(56) References Cited

U.S. PATENT DOCUMENTS

| | | | |
|---|---|---|---|
| 2016/0129528 | A1 | 5/2016 | Hyatt et al. |
| 2016/0159010 | A1 | 6/2016 | Perez et al. |
| 2017/0008123 | A1 | 1/2017 | Mezawa et al. |
| 2017/0008127 | A1 | 1/2017 | Hyatt et al. |
| 2017/0057011 | A1 | 3/2017 | Hyatt et al. |

FOREIGN PATENT DOCUMENTS

| | | | | |
|---|---|---|---|---|
| DE | 102006056422 | B3 | 4/2008 | |
| DE | 202009016400 | U1 | 4/2011 | |
| DE | 102015222207 | A1 | 5/2016 | |
| DE | 102015107179 | A1 | 11/2016 | |
| DE | 102016212290 | A1 | 1/2017 | |
| EP | 2732889 | A2 | 5/2014 | |
| EP | 2732890 | A2 | 5/2014 | |
| EP | 3168033 | A1 | 5/2017 | |
| JP | 2002-210625 | A | 7/2002 | |
| WO | WO 2008/064620 | A1 | 6/2008 | |
| WO | WO 2015/127271 | A1 | 8/2015 | |
| WO | WO-2015127271 | A1 * | 8/2015 | ........... B23K 26/073 |
| WO | WO 2019/076727 | A1 | 4/2019 | |

OTHER PUBLICATIONS

EP Office Action in European Appln. No. 18785608.3, dated Feb. 1, 2022, 13 pages (with English translation).

DE Office Action in DE Appln. No. DE 10 2017 124 177.9, dated Jul. 2, 2018, 5 pages (English Translation).

PCT International Preliminary Report on Patentability in International Appln. No. PCT/EP2018/077742, dated Apr. 21, 2020, 14 pages (with English translation).

PCT International Search Report and Written Opinion in International Appln. No. PCT/EP2018/077742, dated Dec. 4, 2018, 17 pages (with English translation).

CN Office Action in Chinese Appln. No. 201880067909.5, dated Jul. 7, 2022, 19 pages (with English translation).

DE Office Action in German Appln. No. 18785608.3, dated Feb. 1, 2022, 13 pages (with English translation).

* cited by examiner

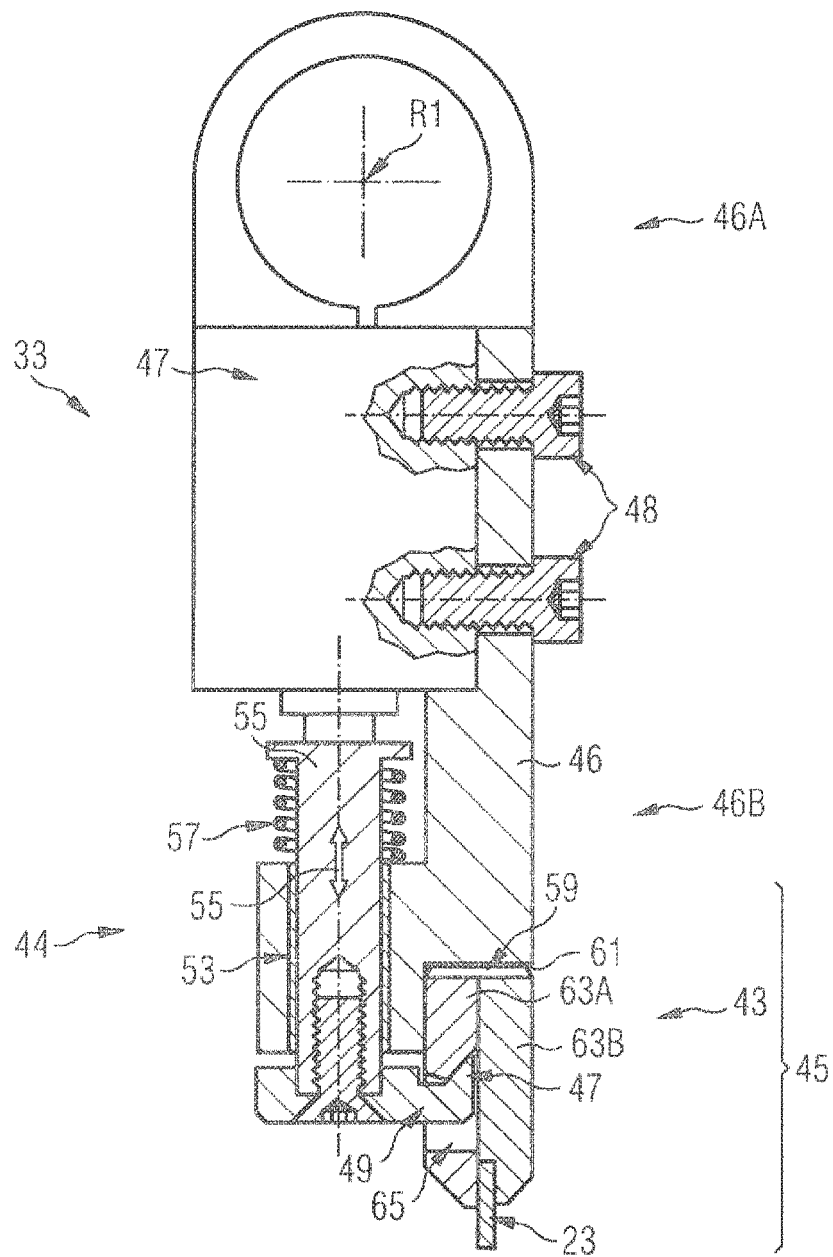

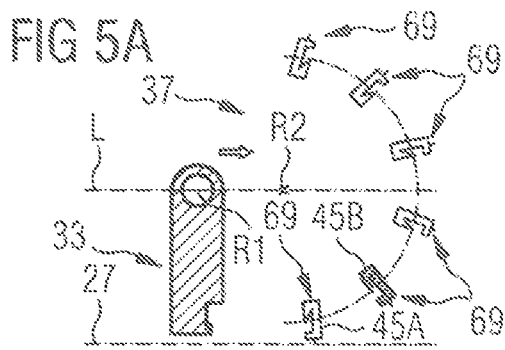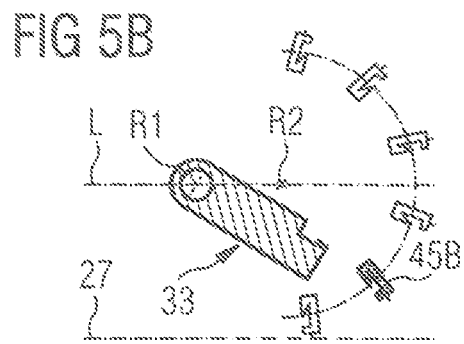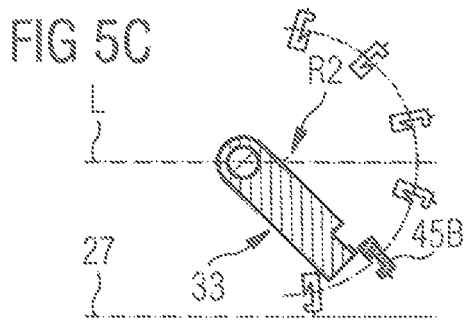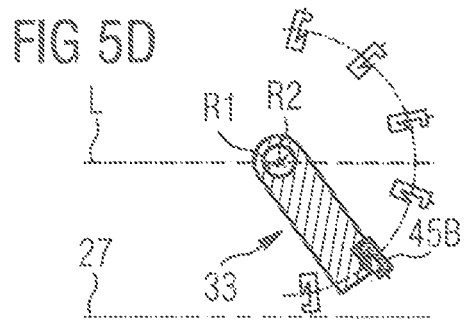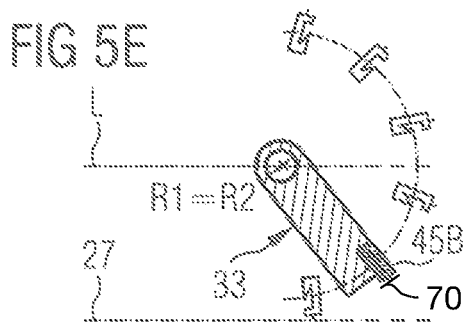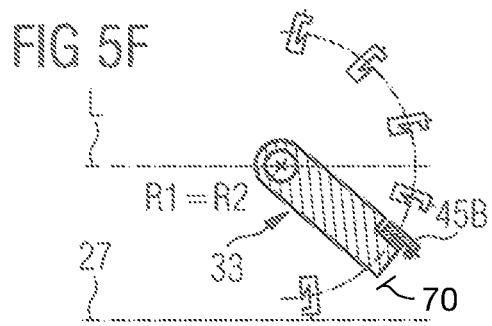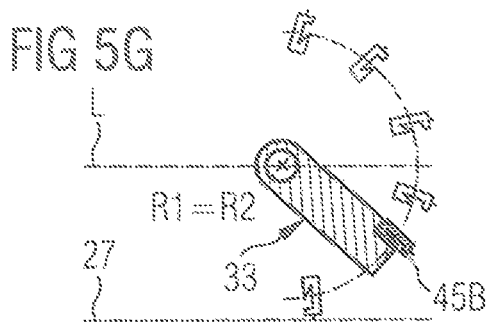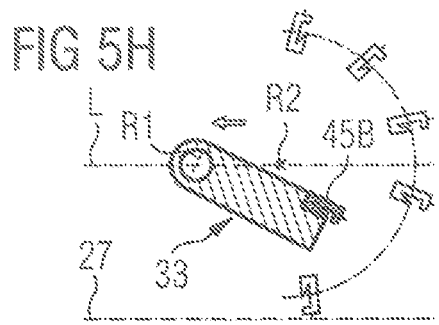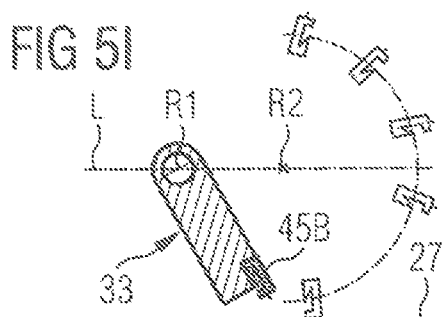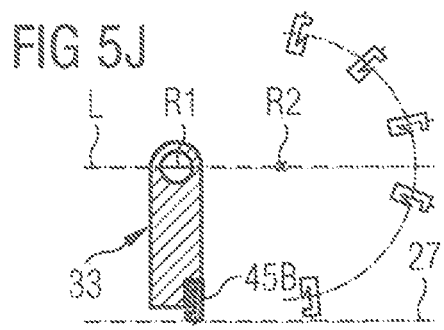

TOOL CHANGE FOR ADDITIVE MANUFACTURING

CROSS REFERENCE TO RELATED APPLICATIONS

This application is a continuation of and claims priority under 35 U.S.C. § 120 from PCT Application No. PCT/EP2018/077742, filed on Oct. 11, 2018, which claims priority from German Application No. 10 2017 124 177.9, filed on Oct. 17, 2017. The entire contents of each of these priority applications are incorporated herein by reference.

TECHNICAL FIELD

The present invention relates to an apparatus for additive manufacturing, in particular laser-based additive manufacturing. Furthermore, it relates to the provision of tools that are used in particular for the preparation of appropriately levelled powder surfaces for a subsequent manufacturing process.

BACKGROUND

The laser-based additive manufacturing of—in particular metallic or ceramic—workpieces is based on the solidification of a starting material in powder form on a building platform by irradiation with laser light. This concept—also known as selective laser melting (SLM), powder bed fusion, and laser metal fusion (LMF)—is used in machines for (metallic) 3D printing, so-called additive manufacturing systems. An example of a machine for additive manufacturing of three-dimensional parts using SLM is disclosed in the European patent application EP 2 732 890 A2 of Sisma S.p.A. The advantages of additive manufacturing are generally a simple production of complex and individually producible parts. In particular, defined structures in the interior and/or force flow-optimized structures can be realized.

The process of laser-based additive manufacturing takes place in a building chamber on a work surface in a manufacturing space. New powder is applied to a building platform for the layer-by-layer production of a 3D part using a coater tool. The coater tool (often in the form of a slider, wiper, squeegee or brush) is generally referred to as an application tool in the following. It may be necessary to replace the coater tool during the manufacturing process. For example, DE 4 325 573 C2 discloses wiper blades for applying the powder coatings, which are replaced depending on the usage. Furthermore, DE 10 2006 056422 B3 discloses the use of rotatably held wiper blades.

A manual replacement of the coater tool is disadvantageous for the manufacturing, because due to high temperatures in the manufacturing space (e.g. higher than 350° C.) there is, for example, the danger of injury to the operator by burnings or a part distortion can occur due to the interruption of the manufacturing process. Accordingly, automated and semi-automated changing mechanisms are known, which, however, to some extent require complex exchange procedures, such as those disclosed in EP 3 168 033 A1 as an example.

Furthermore, mechanisms are known to affect the powder application process. DE 20 2009 016 400 U1, for example, discloses a liftable powder smoothing bar. Furthermore, a manufacturing machine is known from EP 2 732 889 A1, in which a powder slide can be rotated around an axis and moved back to an initial position without affecting the powder bed. Further, DE 10 2015 222 207 A1 discloses a machine tool system that is configured for subtractive machining operations with, e.g., cutting or milling tools that can be mounted in a spindle, and for additive machining processes in combination with a conveyor-based powder transport system. Furthermore, US 2016/0095959 A1 discloses a modular manufacturing system.

SUMMARY

This disclosure features methods for integrating an autonomous change of application tools into an additive manufacturing system. The disclosure further features associated change systems that can be provided in the manufacturing space of additive manufacturing systems as described herein.

In one aspect, the disclosure features methods for taking up a tool unit of an additive manufacturing apparatus in a tool holder. These methods use an additive manufacturing apparatus that includes a linear drive with a base body and the tool holder is attached to the base body so that it can rotate about an axis of rotation. Furthermore, the tool holder can be moved with the base body along a movement axis of the linear drive in a manufacturing space of the additive manufacturing apparatus. The additive manufacturing apparatus also has a tool store in the manufacturing space, which provides several tool places for tool units, whereby the tool unit to be taken up is provided at one of the tool places. Thereby, the tool holder has a clamping device, which has an unclamped operating state for taking up and taking out the tool unit and a clamped operating state for fixing the received tool unit. In particular, the tool holder can be moved with the base body along a movement axis of the linear drive above a work surface which is arranged in a manufacturing space of the additive manufacturing apparatus, the work surface having a platform area and a lower border of a tool unit taken up in a tool holder being movable over the platform area substantially at the height of the work surface.

In these methods, the steps include activating the unclamped operating state of the tool holder; moving the tool holder to the tool place with the provided tool unit by performing a linear movement along the movement axis and a swivel movement about the rotation axis; activating the clamped operating state of the tool holder; and lifting the supplied tool unit out of the tool place.

In some embodiments, the tool holder moves as a swivel arm with a movement superimposed on the linear and swivel movement and rotates around the axis of rotation towards the tool unit until it touches a stop surface of the tool holder. In particular, the tool place is approached from below (for example, if the tool unit is deposited on pins at the tool place).

In some embodiments, activating the clamped operating state via a linear actuator of the tool holder can cause a form-fit and/or force-fit fixing of the tool unit. In this case, clamping wedges of the tool holder can be spring-loaded for form-fit and/or force-fit fixing by releasing a pneumatic system.

In some embodiments, an exact position of the tool unit in the tool holder can be achieved by a force closure and a form closure of the clamping wedges and/or a force closure of at least one blade against a stop surface of the tool holder.

In some embodiments, lifting can cause the tool unit to be detached from pins in the tool place by continuing the swivel movement.

In some embodiments, the tool holder with clamped tool unit can be moved from the tool store into the manufacturing space.

In a further aspect, the disclosure provides methods for depositing a tool unit of an additive manufacturing apparatus as described herein into a tool store that include the following steps: moving the tool holder with the clamped tool unit to the tool place by performing a linear movement along the movement axis and a swivel movement about the rotation axis; activating the unclamped operating state of the tool holder; and moving the tool holder without the tool unit out of the tool store.

Thereby, the tool holder can be used as a swivel arm with a movement superimposed on the linear movement and swivel movement to approach the unoccupied tool place rotating about the rotation axis, preferably until the tool unit engages in pins of the tool place. Thereby, the tool place can be approached in particular from above.

Activating the unclamped operating state can release a form-fit and/or force-fit fixing of the tool unit via (at least) one linear actuator of the tool holder.

In a further aspect, the disclosure features additive manufacturing apparatuses that include: a housing, which provides a manufacturing space for additive manufacturing, a linear drive arranged in the manufacturing space with a base body, which is movable along an axis of movement of the linear drive in the manufacturing space, and a tool holder for carrying a tool unit. The tool holder is attached to the base body so that it can rotate about an axis of rotation and is moved along with the base body along the movement axis of the linear drive. The tool holder further includes a clamping device having an unclamped operating state for taking up and taking out the tool unit and a clamped operating state for fixing the received tool unit. The device further includes a tool store, which is arranged in the manufacturing space and provides a plurality of tool places for tool units, wherein at least one of the tool places can be approached by the tool holder using a linear movement along the axis of movement and a swivel movement about the axis of rotation for taking up or depositing a tool unit. In particular, the tool holder can be moved with the base body along the movement axis of the linear drive above the work surface, so that a lower border of a tool unit taken up in a tool holder can be moved with the linear drive (substantially at the height of the work surface) over the platform area, in particular to define a level of the surface of the powder layer.

In some embodiments, the apparatus may also include a control unit that is configured to perform any of the above described methods.

In some embodiments, at least one of the tool units may include a tool receptor and an application tool clamped in the tool receptor for powder handling. In addition, at least one of the tool units may include a special tool with a pneumatically or electrically operated rotation and/or linear drive axis. For example, the clamping device of the tool holder may have an electric and/or pneumatic actuator and at least one compression spring for setting the operating states.

In addition, at least one of the tool places may have pins for engaging in recesses in the tool unit.

The embodiments disclosed herein may have the following advantages, among others: A tool change can be carried out autonomously by using an existing machine axis. Compared to manually performed tool changes, an automated change can ensure that the tool change can be performed so promptly and quickly that no part distortion occurs due to the interruption of the building process. In particular, it is not necessary to open the manufacturing space and the concepts disclosed herein can be used at high building platform temperatures. In general, the concepts disclosed herein can be implemented with a cost-effective and space-saving configuration of mechanics and sensor technology. Thus, the concepts disclosed herein do not require any additional building space below the building platform, do not unnecessarily restrict the building space and, thus, avoid building costs.

DESCRIPTION OF DRAWINGS

Additional features and their usefulness result from the following description of embodiments on the basis of the drawings.

FIG. 4A and FIG. 4B show side views of an exemplary tool holder with an application tool partly in a sectional view.

FIGS. 5A to 5J are schematic illustrations to illustrate a tool exchange procedure. This series of figures illustrate the movement of a tool holder to take up a fresh tool unit from a tool store and to move the fresh tool to a manufacturing space.

DETAILED DESCRIPTION

Aspects described herein are partly based on the realization that an already existing rotation axis can be used in a tool exchange process in which a tool unit with an application tool is unloaded in a magazine and a new tool unit is taken up.

The tool change concept proposed herein also allows special tool units to be changed in addition to pure application tool units. In general, the tool changer proposed herein can change a large number of different tool units. Examples of tool units include application tools with, e.g., a carbon fiber brush or an X-shaped lip, and special tools such as cleaning tools with a brush for the final cleaning of the process chamber base surface, tools for filling a gap between the working piston and working cylinder with metal powder and repair tools for removing welding spatter (e.g., a tool with grinding shaft).

In connection with FIGS. 1 to 3, an additive manufacturing apparatus is generally described below. Then, in connection with FIGS. 4A, 4B, and 5, an example of a tool holder and a tool exchange process are described.

Figure 1:
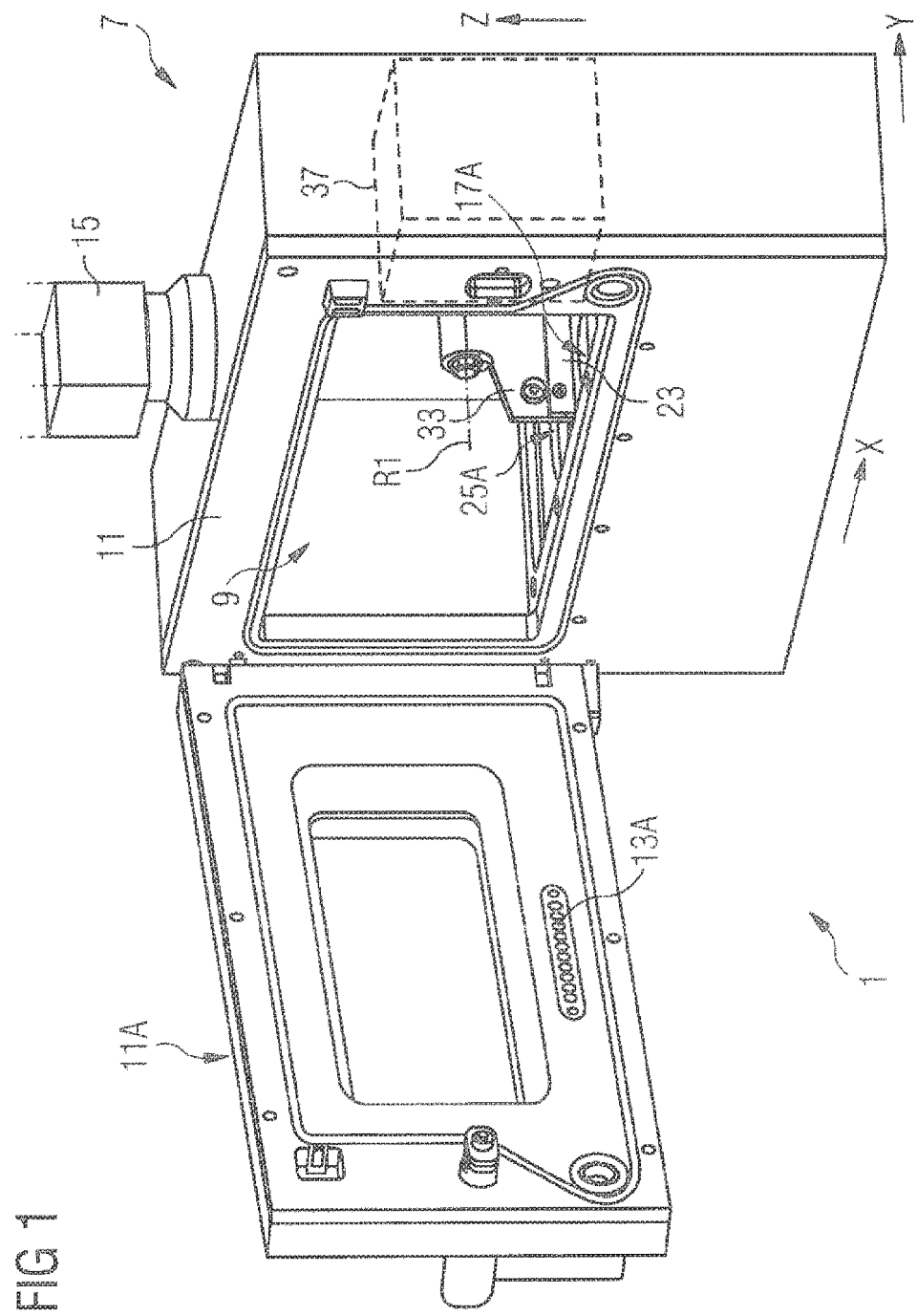
FIG. 1 shows a schematic spatial representation of an example of an additive manufacturing apparatus.
Figure 2:
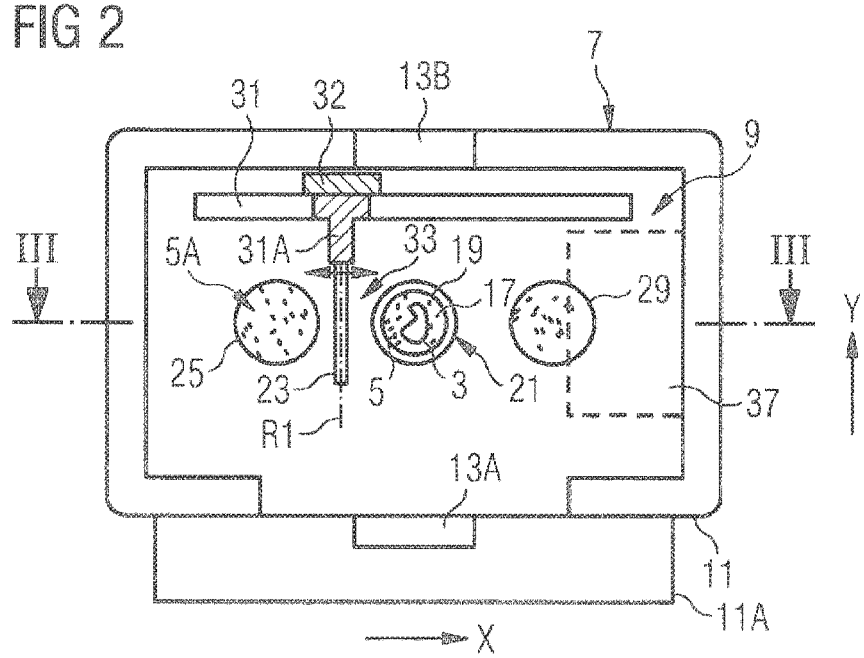
FIG. 2 shows a schematic sectional view of the additive manufacturing apparatus of FIG. 1 parallel to the XY-plane through the manufacturing space.
Figure 3:
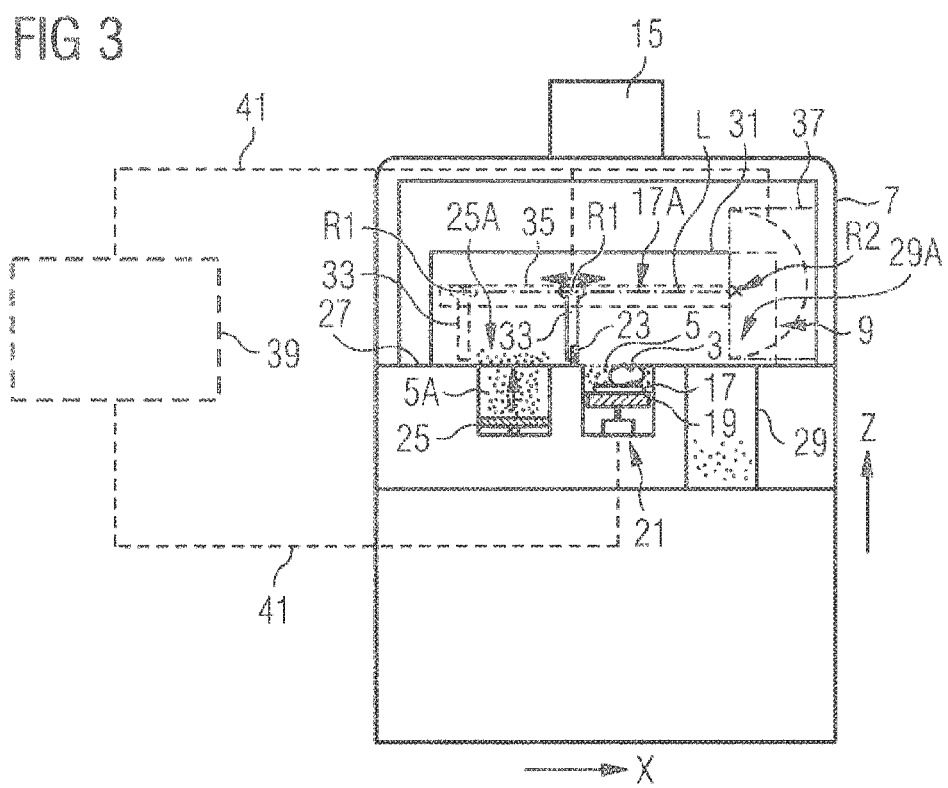
FIG. 3 shows a schematic sectional view of the additive manufacturing apparatus of FIG. 1 parallel to the XZ-plane through the manufacturing space as indicated in FIG. 2.

FIGS. 1 to 3 show an example of an additive manufacturing apparatus 1 for the additive generation of a three-dimensional part 3 from a powdery material (generally powder 5) in a perspective view as well as in schematic sectional views. Regarding the manufacturing process, reference is made to EP 2 732 890 A2 mentioned in the beginning.

The manufacturing apparatus 1 includes a housing 7, which provides a manufacturing space 9. A door 11A in a front wall 11 provides access to the manufacturing space 9. The housing 7 further includes a protective gas extraction system with, e.g., outlet openings 13A for flooding the manufacturing space 9 with inert gas, and extraction openings 13B. An irradiation system 15, e.g., mounted above the housing, is configured to generate, for example, laser light, which fuses the powder 5 to form material layers of a 3D-part 3.

Figure 4B:
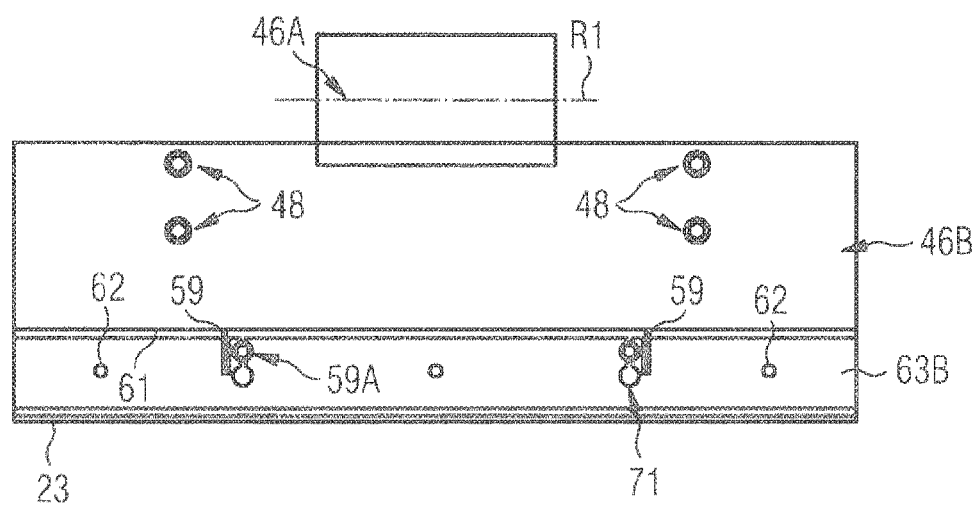

The manufacturing process takes place on a work surface 27, which forms the floor of the manufacturing space 9 and has a platform area 17A, a storage area 25A, and optionally a powder collection area 29A. The manufacturing process takes place on a building platform 17, which is located in the platform area 17A, e.g., centrally in front of the door 11A. The building platform 17 rests on a carrier 19, which can be moved vertically (in FIG. 3 in the ±Z direction) within a building cylinder 21. The storage area 25A is used to provide new powder 5A, which is transferred to the building platform area 23A with an application tool 23 for layer-by-layer production of the 3D part 3. FIGS. 4A and 4B illustrate an example of how an application tool can be configured.

On the building platform 17, a powder bed filled with, for example, metallic or ceramic powder, is prepared for irradiation with the laser light from above. As shown in FIGS. 1 to 3, the application tool 23 is used to distribute the powder 5 in the X direction during the manufacturing process. During the coating process, a lower area of the applicator tool 23 sweeps over the work surface 27, taking powder with it, and thereby filling areas that are, for example, lowered with respect to the work surface. In these areas, the lower area of the application tool 23 defines the level of the powder surface. For the type of application described, one uses as the application tool, for example, brushes, blades made of steel or ceramics, and elastic lips made of elastomers to distribute the powder. This means that the lower area of the application tool 23 can be configured, for example, as a blade, carbon fiber brush, X-shaped rubber lip, or also as a gap filling brush. The level of the powder surface, especially within the building cylinder 21, corresponds to the surface of the powder bed in the production process and the last layer applied during the manufacturing process. The level is defined by the lower border of the application tool 23 and normally is essentially at the height of the work surface 27.

In summary, in the coating process, fresh powder 5A, which is provided in a storage cylinder 25 provided in the storage area 25A, is moved with the application tool 23 over the work surface 27 to the platform area 17A, where it is distributed in the area of the lowered building platform 17 and forms a new surface layer accordingly. Powder that is not required is, for example, pushed into a collection cylinder 29, which is provided in the powder collection area 29A. In some coating processes and intermediate steps, decoating can also be performed. During decoating, the application tool 23 can remove a layer of powder from the previously lifted building platform by brushing over it, and in an analog manner form a fresh surface.

As shown in FIGS. 1 to 3, as an example, the storage area 25A, the platform area 17A, and the powder collection area 29A are arranged next to each other displaced in the X direction and the application tool 23 can be moved linearly in the X direction accordingly.

For a linear displacement of the application tool 23 in the X direction, the manufacturing apparatus 1 includes a linear drive 31 in the rear part of the housing 7. The linear drive 31 is based, for example, on a recirculating ball bearing guide or a belt drive for a linear back and forth movement of a base body 31A, to which a tool holder 33 is attached via a hollow shaft rotatably supported (not shown explicitly). The application tool 23 is attached to a lower end of the tool holder 33. FIGS. 1 to 3 indicate, as an example, a rotation axis R1 of the hollow shaft. The hollow shaft/rotational axis R1 protrudes into the manufacturing space 9 and is used in the tool change concept described herein exemplarily. The rear part of the housing with the linear drive 31 and the manufacturing space 9 are separated from each other, whereby a narrow slot is covered by a movably supported metal or textile band 35, which is indicated schematically (in dashed lines) in FIG. 3.

Furthermore, the manufacturing apparatus 1 has a tool store 37 and optionally a camera (not shown). The tool store 37 provides tool units for tool exchange. The camera is especially configured for the platform area 17A and can provide image data of the powder bed surface to evaluate the quality of the powder surface.

In summary, the manufacturing process includes a repeated lowering of building platform 17 in the building cylinder 21, a build-up of a fresh powder layer on building platform 17, and a fusing of the powder layer in the area where the 3D part 3 is to be generated. FIG. 3 shows the partially completed 3D-part 3, which is embedded in unmelted powder 5. Normally, the manufacturing takes place at elevated temperatures, which can be in the range of 300° C. and more due to a heating system for heating the powder and due to the welding process.

As mentioned above, a defined surface of the powder bed is desired (e.g., a horizontal, precisely aligned, plane alignment of a powder surface). This is achieved with the correspondingly aligned application tool 23. Usually, before the new powder layer is applied, the building platform of the building chamber is lowered by one layer thickness (so-called Z increment) so that the application tool 23 can be moved back over the previously coated powder layer in order to again distribute fresh powder 5A from the supply for a new powder layer on the building platform 17. The previously coated surface can be lowered slightly to avoid damaging the powder layer. For processing, the building platform 17 is then moved back to its original position.

Alternatively, instead of lowering the building platform 17, the application tool 23 can be swiveled around a higher pivot point so that it is lifted off the powder bed on the return journey to the powder supply. This is done, for example, with the hollow shaft by swiveling the application tool 23 upwards about the rotation axis R1. Accordingly, the building platform 17 does not have to be lowered before the application unit returns, which improves the service life of the piston seals and accelerates the overall process.

The rotation axis R1 runs along the upper end of the tool holder 33, so that the application tool 23 is rotatably mounted. A servo geared motor 32 with an electromagnetic brake can be provided on the base body 31A. The rotatably mounted shaft is connected at its rear end to the servo geared motor 32 via a pair of gears. The tool holder 33 is attached to the front end of the shaft. The servo geared motor 32 can cause a controlled swivel movement of the application tool 23 about the rotation axis R1. In particular, it allows the application tool 23 to be rotated about the rotation axis R1 within an angular range or even to be freely positioned by 360°. For example, the rotation axis R1 lies on the linear movement axis L of the recirculating ball bearing guide (or, for example, the belt guide).

However, damage to the application tool 23, especially to the tool edge interacting with the powder, may occur during the manufacturing process. This can happen, for example, due to interfering contours that unintentionally grow during production, sharp metal splashes or similar. This tool wear and tear can be detected, for example, with a camera by means of a dark-field illumination and image processing. The need for a tool change can, thus, be signaled to an operator and the tool unit can be replaced before a faulty coating occurs, generally reducing the rejected parts. In addition, replacement can be routinely performed at predetermined time intervals.

In order not to jeopardize the quality of the part, the tool change is preferably carried out immediately after the detection of wear and tear of the application tool 23. As mentioned above, a manual change can cause unplanned delays, which, in conjunction with an axis stop triggered by the machine, can lead to the risk of thermal distortion of the portion of the workpiece already produced. A visible defect in the position in the workpiece can occur, which corresponds to the processing pause during tool change. This is particularly critical in a heated manufacturing space, as the cooling gradient is usually stronger here than in a non-heated manufacturing space.

In the following, FIGS. 4 to 6 illustrate a concept for the rapid change of a processing tool, such as an application tool for forming the surface layer. This allows not only application tools but also special tools to be automatically spanned, which are provided in the tool store 37 within the manufacturing space 9.

The tool change is controlled by a control unit 39. The control unit 39 can be part of the control system of the manufacturing apparatus 1 or can be provided as an independent unit specifically for the tool change. In FIG. 3, the control unit 39 is schematically indicated by dashed lines and is connected to the tool holder 33 and the tool store 37 via data connections 41 (also in dashed lines).

The underlying system for the tool change is configured such that the exchange can be carried out with the manufacturing space 9 being closed. It is based on the combination of a rotational movement of a tool unit around the rotation axis R1 and a linear movement with the aid of the linear drive 31 along the movement axis L.

For the automated tool change explained below, the already mentioned arrangement of the application tool 23 is used, in which the application tool 23 is rotatably mounted via the tool holder 33, which acts as a swivel arm, for example, close to or on the linear movement axis L of the linear drive 31.

FIGS. 4A and 4B show the tool holder 33 with a tool receptor 43 in which an application tool 23 is clamped. The tool receptor 43 and the application tool 23 represent an interchangeable tool unit 45 (also called tool). FIG. 4A shows a carrier element 46, partially shown in section, with an axis receiving section 46A for receiving the hollow shaft and a swivel section 46B, to which the tool unit 45 is attached. In FIG. 4A, the rotation axis R1 is indicated in the axis location section 46A.

The tool holder 33 also has one or more, for example two, linear actuators 47, which are attached to the swivel section 46B with screws 48. In combination with a clamping device, the linear actuator 47/the linear actuators allow, for example, two movable clamping wedges 49 of the clamping device to be fixed or released. The clamping wedges 49 are arranged next to each other at the far end of the swivel element section 46B and screwed to guide shafts 51. The guide shafts 51 extend through plain bearings 53 in the swivel element 46B and can be moved by the linear actuator 47/the linear actuators (double arrow 55). A clamping force acts on each clamping wedge 49 via, for example, two compression springs 57 arranged symmetrically next to the respective clamping wedge. The clamping force of the compression springs 57 is counteracted by the pneumatically or electromotively controlled linear actuator 47/the linear actuators. The linear actuator(s) 47 are configured so that the tool holder 33 can take up a tool unit 45 from the tool store 37 in a form-fit and force-fit manner.

The tool unit 45 shown in FIGS. 4A and 4B is a passive tool unit, which has a blade or brush as an application tool 23 for applying and distributing powder. In other embodiments, active tool units, such as a milling tool or a grinding shaft, can be taken up by the tool holder 33. For example, rotating tool units can be used to eliminate the previously mentioned interfering contours—such as sharp-edged metal splashes—which can grow up unintentionally during the manufacturing process. To operate active tool units, the tool holder 33 can, for example, have an interface for transmitting a low voltage of up to 40V, for example. In addition, an electrical drive can be arranged in the hollow shaft of the rotating tool, for example.

Preferably, the respective tool units have tool receptors 43, which provide features for the correct orientation of the tool, in particular the application tool 23, in the tool holder 33.

For this purpose, each tool receptor 43 is equipped with, for example, two or more hard blades 59, which, in conjunction with one (or one each) hard stop surface 61 of the tool holder 33, ensure that the tool unit 45 is indexed in the correct position (essentially a desired orientation) with respect to the tool holder 33. A blade clamping mechanism 59A, which enables a corresponding precise adjustment, especially clamping without lateral force, of the blades 59, is indicated in FIG. 4B. In this case, the hard blades 59 index the mounting unit force-fit on the stop surface as the reference face of the tool receptor 43. For example, the hard blades serve as an end stop in the Z direction. Under the hard mating surface there may be one or more thin, interchangeable precision plates, which can be added or removed when adjusting the alignment/straightness. The blade can be configured as a sharp and hard wedge or a similar geometry with the smallest possible face area can be selected.

The tool receptor 43 can be configured with two shells. As an example, two clamping jaws 63A, 63B form a C-shaped frame with a recess 65 in which the clamping wedges 49 engage. This allows the tool receptor 43, and thus the application tool 23, to be fixed force-fit to the tool holder 33.

To attach the application tool 23, the tool receptor 43 has a negative form of the application tool 23, for example a negative form of a wedge. The application tool 23 is clamped in the tool receptor 43 via a force and form fit. In FIG. 4A, for example, the clamping jaws 63A, 63B are screwed together. It is important here that a reference position of the application tool 23 in the manufacturing apparatus 1 is ensured by a correspondingly correct mounting of the application tool 23, as explained below as an example.

The tool receptor 43 can thus be inserted and clamped in a device that is functionally similar to the tool holder 33. For example, the device has indexing features (e.g., the described wedges) for engaging in the tool receptor 43 and corresponding actuators for the form-fit and/or force-fit holding of the tool receptor 43. The device also has clamping wedges and a clamping device. These index the receptor unit (tool receptor 43) force-fit against one end face of the device and form-fit against the reference surface of the device. The form-fit relation is created, for example, between the two sharp, hardened blades 59 and a hardened end face.

In one example of tool receptor 43, the application tool 23 is inserted into the open tool receptor 43, here the accessible negative mold. It is aligned flush with a reference plane of the device and, for example, placed against the lower leg of the C-shaped frame. The application tool 23 is then force-fit connected, e.g., by means of screws 62, in the tool receptor, where it is held pressed in. The fixing or mounting of the tool receptor 43 in the device can now be released and the tool unit 45 with the application tool aligned can be taken out. Here, for example, the lower border of the application tool 23 is aligned exactly parallel to the surface at the upper end of the tool receptor 43, which is formed by the cutting edges of the two blades. This procedure is repeated with all tool units that are to be set up in tool store 37. The underlying device can, for example, be assigned to the manufacturing apparatus 1 or used as a separate operating resource.

The described procedure guarantees that the tool edges of all set up tools have the same reference relative to the stop surface of the tool holder. A new application tool 23 can thus be changed reliably in relation to a defined reference plane.

As shown in the examples of FIG. 2 and FIGS. 5A to 5J, the tool store 37 can be provided for tool replacement on an inner wall of the manufacturing space 9 in the area of powder collection area 29A. In the illustrations in FIGS. 5A to 5J, the tool store 37 is configured in the form of a half shell, which extends around a center R2, for example. On this half-shell, at several tool places 69, for example, further exchangeable tool units 45 are equipped with application tools 23 or special tools, such as the special tools already mentioned for cleaning the process chamber, for the first filling of gaps between building platform 17 and building cylinder 21 (with powder) as well as for the removal of interfering contours and sharp metal splashes that unintentionally grow up in the process. In some embodiments, the half-shell can be rotated around the center R2. However, a rotatable half-shell is not necessary, particularly if a sufficiently wide angular movement of the axis of rotation of the tool holder 33 is provided, which allows each of the tool places 69 to be approached without, for example, requiring a further rotational movement of the half-shell.

The space available is sufficient for setting up several tool units 45, for example. FIGS. 5A to 5J show an example of six tool units 45. Each tool place 69 has a support surface as well as two (indexing) pins (a pin 70 is shown schematically in FIGS. 5E and 5F) that can engage in corresponding receptors 71 (see FIG. 4B) in the clamping jaws 63A, 63B to define the position of the equipped tool unit 45 in space. If one of the six tool units 45 has been mounted, there are thus five additional exchange tool places available in the tool holder 33 and one empty place for depositing the already indexed tool unit.

Instead of the half-shell-shaped arrangement of the tool store, a chain store configuration (paternoster system-like) or a store on a vertical linear slide, for example, could be used alternatively.

As described herein, it is proposed to perform the changing process by a combined movement along the feed axis (movement axis L) of the application unit and around the swivel axis (rotation axis R1). For example, the movements along the feed axis and around the swivel axis are controlled by a superimposed numerical control (NC). Thereby, some of the movements are performed simultaneously, so that no collision can occur between tool holder 33 and tool unit 45 or tool receptor 23.

Taking up a tool is described below with reference to FIGS. 5A to 5J, whereby the tool holder 33 must be free. Accordingly, taking up a tool was preceded, for example, by moving to a free tool place in tool store 37 and storing a tool unit 45A that is no longer required or is worn (not shown). Such a storage process essentially corresponds to the reverse take up process as described below.

To take up a (fresh) tool unit 45B, the indexing clamping wedges 49 are first released, e.g., pneumatically (FIG. 5A)). To take up the tool unit 45B, it is approached from below and lifted out of the rest position. To do this, the tool holder 33 approaches the tool unit 45B as a swivel arm with a superimposed movement counterclockwise turning around the rotation axis R1 until it touches the front face of the tool holder 33 (FIGS. 5B to 5E). The tool unit 45B is then fixed in a form-fit and force-fit manner via the linear actuator 47/the linear actuators of the tool holder 33 by releasing the pneumatics and spring-loading the clamping wedges of the indexing system (FIG. 5E). The exact position of the tool unit in the tool holder 33 is achieved by the form-closure and force-closure of the clamping wedges 49 as well as the force-closure of the two blades 59 against the reference surface of the tool holder 33. By a further left-hand rotation, the indexed tool unit is released from the tool store 37 (FIGS. 5F and 5G) and moved from the tool store 37 to the manufacturing space 9 by a superimposed movement (FIGS. 5H and 5I). The lifting causes a release of the tool unit (45) from respective pins 70 of the tool place. There, for example, it can be adjusted around the axis of rotation R1 in such a way that the lower edge of the application tool 23 is just above the working surface 27 (FIG. 5J).

In the example described, a tool unit is deposited with a clockwise rotation, and a new tool unit is taken up as described with a counterclockwise rotation of the tool holder 33.

In the aforementioned use of a vertical linear slide, for example, to provide tool places, the tool holder 33 can be aligned horizontally via the axis of rotation R1, whereby the linear slide then approaches a tool place from above, from which a tool unit 45 is removed, and deposited on the tool holder 33 or into which a tool unit 45 is deposited.

In some embodiments, the linear drive 31, and thus the tool holder 33, can also be changed in its height with respect to the working surface 27, so that the movement to the starting position of the application tool above the supply cylinder 25 can take place, for example, in a raised position of the linear drive 31.

Other Embodiments

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A method for taking up a tool unit of an additive manufacturing apparatus in a tool holder,
   wherein the additive manufacturing apparatus includes a linear drive having a base body, the tool holder is mounted on the base body so as to be rotatable about an axis of rotation, and the tool holder can be moved with the base body along a movement axis of the linear drive above a work surface, which is arranged in a manufacturing space of the additive manufacturing apparatus, wherein the work surface has a platform area and a lower border of a tool unit taken up in a tool holder is movable substantially at the level of the work surface over the platform area, wherein the additive manufacturing apparatus further includes a tool store in the manufacturing space, which provides a plurality of tool places for tool units, wherein the tool unit is provided on one of the tool places, and wherein the tool holder includes a clamping device comprising one or more actuators and one or more compression springs to set an unclamped operating state for taking up and taking out the tool unit and a clamped operating state for fixing the tool unit that was taken up, wherein in the clamped operating state, a stop surface of the tool holder is contacted by the tool unit for positionally correct indexing, the method comprising:

activating the unclamped operating state of the tool holder;

moving the tool holder to the tool place of the plurality of tool places on which the tool unit is provided by performing a linear movement along the movement axis and a swivel movement about the rotation axis;

activating the clamped operating state of the tool holder so that the stop surface of the tool holder is contacted by the tool unit; and lifting the provided tool unit out of the tool place.

2. The method of claim 1, wherein the tool holder acting as a swivel arm approaches the tool unit while rotating about the axis of rotation with a movement comprised of a superposition of the linear movement and the swivel movement until the latter touches a stop surface of the tool holder.

3. The method of claim 1, wherein activating the clamped operating state with a linear actuator of the tool holder causes a form-fit and/or force-fit fixing of the tool unit.

4. The method of claim 3, wherein for the form-fit and/or force-fit fixing, clamping wedges of the tool holder are spring-clamped by releasing a pneumatic system.

5. The method of claim 1, wherein an exact position of the tool unit in the tool holder is achieved by a force closure and a form closure of clamping wedges or a force closure of at least one blade against a stop surface of the tool holder.

6. The method of claim 1, wherein the tool place is approached from below by continuing the swivel movement, and the lifting causes a release of the tool unit from pins of the tool place.

7. The method of claim 1, further comprising moving the tool holder with clamped tool unit from the tool store into the manufacturing space.

* * * * *